United States Patent [19]
Reich et al.

[11] Patent Number: 6,100,342
[45] Date of Patent: *Aug. 8, 2000

[54] EPOXIDIZING CARBOXY-FUNCTIONAL ACRYLATE COPOLYMERS WITH EPIHALOALKANE

[75] Inventors: Albert Reich, Trin; Andreas Kaplan; Rene Gisler, both of Chur, all of Switzerland

[73] Assignee: EMS-Inventa AG, Zürich, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,157

[22] Filed: Jul. 3, 1997

Related U.S. Application Data

[62] Division of application No. 08/620,342, Mar. 22, 1996, abandoned.

[30] Foreign Application Priority Data

Jun. 23, 1995 [DE] Germany ............ 195 22 952

[51] Int. Cl.$^7$ ............. C08F 8/08; C08L 27/22
[52] U.S. Cl. ........ 525/330.1; 525/170; 525/221; 525/329.5
[58] Field of Search ............ 525/327.3, 329.7, 525/170, 221, 329.5, 330.1

[56] References Cited

U.S. PATENT DOCUMENTS

| | | | |
|---|---|---|---|
| 3,294,769 | 12/1966 | Hicks ................... | 525/329.5 |
| 3,781,379 | 12/1973 | Theodore et al. | |
| 4,042,648 | 8/1977 | Kitamura et al. | |
| 4,091,048 | 5/1978 | Labana et al. ......... | 525/186 |
| 4,091,049 | 5/1978 | Labana et al. ......... | 525/329.3 |
| 4,346,144 | 8/1982 | Craven ................... | 525/117 |
| 5,055,524 | 10/1991 | Pettit, Jr. et al. ...... | 525/176 |
| 5,436,311 | 7/1995 | Hoebeke et al. ....... | 525/176 |

FOREIGN PATENT DOCUMENTS

| | | |
|---|---|---|
| 1208075 | 12/1965 | Germany . |
| 2507126 | 11/1976 | Germany . |
| 60-79006 | 5/1985 | Japan . |
| 0078413 | 8/1975 | Poland . |

OTHER PUBLICATIONS

Sandner, Barbara, "Kinetics of the Polymer–Analogous Reaction of Poly [(Methyl Methacrylate)–co–(Methacrylic Acid)] with Epichlorohydrin", Makromol. Chem, 192, pp. 767–777, 1991.

Sandner et al, "Introduction of hydroxyethyl and glycidyl ester groups into methyl methacrylate copolymers by polymer analogous reactions," Applied Macromolecular Chemistry, vol. 181, pp. 171–182, 1990.

Chemical Abstracts, vol. 103, No. 22, Dec. 2, 1985, abstract No. 179115, Columbus, Ohio.

*Primary Examiner*—Robert E. Sellers
*Attorney, Agent, or Firm*—Browdy and Neimark

[57] ABSTRACT

A powder coating is prepared by (a) solvent polymerizing carboxy-functional acrylate copolymers, (b) separating and reacting the copolymers with a molar excess of at least one epihaloalkane, (c) removing excess epihaloalkane, (d) adding toluene and then reacting the copolymers with a sodium hydroxide solution to produce epoxy groups-containing acrylate copolymers having an epoxide number of from 0.018–0.501 eq/100 g copolymer, a weight average molecular weight of from 1000–30,000 and a Tg of from 20–120° C.; and (e) extruding the epoxy groups-containing acrylate copolymers with a hardener such as aliphatic polybasic acids or anhydrides, or carboxy-functional polyesters or acrylic resins along with additives such as pigments or fillers.

24 Claims, No Drawings

EPOXIDIZING CARBOXY-FUNCTIONAL ACRYLATE COPOLYMERS WITH EPIHALOALKANE

This is a division of parent application Ser. No. 08/620,342 filed Mar. 22, 1996, abandoned.

The invention relates to novel thermosetting powder coating systems, also called powder coatings, containing special epoxy groups-containing acrylate copolymers, suitable hardeners and/or pigments and/or fillers and/or additives and it relates to a method for producing these powder coating systems.

Epoxide-containing acrylate copolymers and their use as binder resins in powder coatings are already known. The following patents can be cited as examples: U.S. Pat. No. 3,781,379, U.S. Pat. No. 4,042,645 and U.S. Pat. No. 4,346,144. Polybasic acids, preferably dibasic acids, their anhydrides, or substances which form a dibasic acid under hardening conditions are used in this connection. However, other carboxyl-functional compounds can basically also be used as hardeners, such as amorphous and/or semi-crystalline polyester resins and/or acrylate resins with free carboxyl groups.

The copolymers described in the above mentioned patents all contain glycidyl acrylate or glycidyl methacrylate, the remainder of the copolymers consists of the unsaturated monomers. These are glycidylester groups-containing acrylate copolymers.

DE-A-25 07 126 claims a powder coating, based on a glycidyl groups containing binder resin, which needs liquidity promotoers for the reasons of a very special structure and which consists of 80 to 96% by weight of special monomers, having on their parts hydroxyl groups or epoxy groups.

The production of monomeric glycidyl (meth)acrylate is not easy from a technical viewpoint, since glycidyl (meth) acrylate is easily polymerized and the isolation of the pure monomers is very problematical. In addition to a short shelf life of glycidyl (meth)acrylate, its high toxicity also causes problems during processing. Therefore the production of glycidylester groups-containing acrylate polymers by means of the copolymerization of glycidyl (meth)acrylate is problematic and cannot be recommended. A further disadvantage of this process is that water cannot be used as reaction medium.

U.S. Pat. No. 3,294,769 describes in a general manner a process for producing acrylate polymers containing glycidylester groups by means of the conversion of carboxyl-functional acrylate polymers via their halohydrinester with alkaline material. The properties and possibilities of use of this glycidylester groups-containing acrylate polymer are not described.

Saponification of methyl methacrylate polymers and the subsequent conversion with epichlorohydrin has been researched and described by Sandner et al. (see Angew. Makromol. Chemie [Applied Macromol. Chemistry] 181 (1990), pp. 171 to 182, and Makromol. Chemie 192 (1991), pp. 762 to 777). Possibilities of use of these products were not mentioned.

It is therefore one object of the invention to make available novel thermosetting powder coating systems on the basis of defined new acrylate copolymers containing epoxy groups. It is furthermore intended to propose a novel method for producing said epoxy groups-containing acrylate copolymer based powder coating systems, wherein for reasons of process technology and toxicology it is intended to omit the use of glycidyl(meth)acrylate in the production of acrylate copolymers containing epoxy groups.

This object is attained by means of the thermosetting powder coating systems on the basis of epoxy groups-containing acrylate copolymers with the components (A) as binder resins (B) as hardeners and if required (C) as additives, in accordance with claim 1, wherein the epoxy groups-containing acrylate copolymer (A) has a molecular weight (Mw) of 1000 to 30,000, preferably 1,000 to 20,000, a glass transition temperature (Tg) of 20 to 120° C. and can be obtained by producing in a first step a carboxyl group-containing copolymer (D), which is, after separation, subsequently converted to the acrylate copolymer containing epoxy groups (A) by a conversion with epihaloalkanes. The above object is furthermore obtained by the process in accordance with claim 1 as well as by the use of the coating system to produce a thermosetting powder coating.

The invention therefore relates to thermosetting powder coating systems, also called powder coatings, containing:

(A) an epoxy groups-containing acrylate copolymer as binder resin, (B) an aliphatic and/or cycloaliphatic polybasic acid and/or its anhydride and/or a polyol-modified anhydride of a polybasic acid and/or amorphous or semi-crystalline carboxyl-functional copolyester resins and/or carboxyl-functional acrylate resins or their mixtures as hardeners, and (C) optionally fillers and/or pigments and/or additives in accordance with the prior art, wherein the epoxy groups-containing acrylate copolymer (A) has a molecular weight (Mw) of 1,000 to 30,000, preferably of 1,000 to 20,000, a glass transition temperature (Tg) of 20 to 120° C. preferred of 20 to 90° C. and an epoxide number of 0.018 to 0.510, preferably 0.04 to 0.20 and can be produced in that in a first step a carboxyl-functional copolymer (D) by radical copolymerisation, preferred by means of a solvent or a substance polymerisation, is produced, which, after separation, subsequently is transformed in further steps by the conversion with epihaloalkanes into the epoxide group-containing acrylate copolymer (A), and wherein the copolymer (D) in particular is obtained by radical copolymerization of a monomer mixture of:

(a) 0 to 70 parts by weight of methylacrylate or methylmethacrylat or their mixtures (b) 0 to 60 parts by weight of (cyclo)alkyl esters of acrylic or methacrylic acid with 2 to 18 carbon atoms in their alkyl or cycloalkyl moieties, (c) 0 to 90 parts by weight of vinyl aromatics, (d) 1 to 70 parts by weight of olefinically saturated carboxylic acids, wherein the sum of the parts by weight of the components (a) to (d) is 100.

The inventive carboxyl-functional acrylate copolymers (D) have an acid number of 10 to 400 (mg KOH/g), whereby acid numbers between 10 and 200 are preferred.

The monomers (b) are preferably alkyl or cycloalkyl esters of acrylic or methacrylic acid with 2 to 18 carbon atoms in the alkyl or cycloalkyl moieties. Examples of suitable or preferred suitable monomers (b) are ethyl (methyl)acrylate, n-propyl (meth)acrylate, isopropyl (meth) acrylate, n-butyl (meth)acrylate, isobutyl (meth)acrylate, tert. butyl (meth)acrylate, 2-ethylhexyl (meth)acrylate, cyclohexyl methacrylate, neopentyl methacrylate, isobornyl methacrylate, 3,3,5-trimethylcyclohexyl methacrylate, stearyl methacrylate and their mixtures.

Styrene, vinyl toluene and α-ethylstyrene and their mixtures are to be considered as monomers (c). Examples of (d) are acrylic and methacrylic acid, crotonic acid, itaconic acid, fumaric acid, maleic acid citraconic acid and their mixtures.

The epihaloalkanes are selected from the group 1-chloro-2, 3-epoxypropane (epichlorohydrin), 1-chloro-2,3-epoxybutane, 1-chloro-2-methyl-2,3,epoxypropane, epibromohydrin and their mixtures.

The component (B) is advantageously selected from the group saturated aliphatic polycarboxylic acids with 4 to 13 C atoms, whereby dicarboxylic acids are preferred, cycloaliphatic dicarboxylic acids with 8 to 15 C atoms, monomeric or polymeric or polyol-modified anhydride of an aliphatic or cycloaliphatic dicarboxylic acid, amorphous, carboxyl-functional copolyester resins having an acid value number of 10 to 200 (mg KOH/g) and a Tg higher than 40° C., semi crystalline carboxyl-functional copolyester resins having an acid value number of 10 to 400 (mg KOH/g), carboxyl-functional acrylate resins, having an acid value number of 10 to 400 (mg KOH/G).

Aliphatic polybasic acids, preferably dibasic acids, such as adipinic acid, pimelic acid, suberic acid, azelaic acid, sebacic acid, malonic acid, succinic acid, glutaric acid, 1,12-dodecane dioic acid, etc. can be used as the hardeners—components (B)—. The anhydrides of these acids can also be employed, for example glutaric acid anhydride, succinic acid anhydride, as well as the polyanhydrides of these dicarboxylic acids. These polyanhydrides are obtained by intermolecular condensation of the said aliphatic dibasic dicarbonic acids.

Examples are adipic acid (poly) anhydride, azelaic acid (poly) anhydride, sebacic acid (poly) anhydride, dodecane dioic acid (poly) anhydride, etc. The polyanhydrides have a molecular weight (average weight in relation to the polystyrene standard) of 1000 to 5000. The polyanhydrides can also be modified with polyol.

The polyanhydrides can also be employed in a mixture with the aliphatic dibasic dicarboxylic acids as hardening agents, or in a mixture with hydroxycarboxylic acids, which have melting points between 40 and 150° C., for example 12- hydroxy stearic acid, 2- or 3- or 10-hydroxy octadecanioc acid, 2-hydroxy myristic acid.

Cycloaliphatic dicarboxylic acids, such as 1,4- cyclohexane dicarboxylic acid, or their polyanhydrides can also be employed as hardeners.

Amorphous and semi-crystalline carboxyl-functional copolyesters are also suitable hardeners.

The amorphous as well as the semi-crystalline carboxyl-functional copolyesters can be produced by condensation processes (esterification and/or transesterification) known for polyesters in accordance with the prior art. If necessary, it is also possible to use suitable catalysts, such as dibutyl stannic oxide or titanium tetrabutylate. Suitable amorphous carboxyl-functional copolyester resins have an acid value number of 10 to 200 (mg KOH/g) and a glass transition temperature of >40° C. Amorphous carboxyl-functional copolyesters mainly contain aromatic polybasic carboxylic acids as acid components, such as terephthalic acid, isophthalic acid, phthalic acid, pyromellitic acid, trimellitic acid, 3,6-dichlorophthalic acid, tetrachlorophthalic acid and, to the extent available, their anhydride, chloride or ester. They mostly contain at least 50 mol-% terephthalic acid and/or isophthalic acid, preferably 80 mol-%. The remainder of the acids (difference with 100 mol-%) consist of aliphatic and/or cycloaliphatic polybasic acids, such as 1,4-cyclohexane dicarboxylic acid, tetrahydrophtalic acid, hexahydroendomethylene terephthalic acid, hexachlorophthalic acid, azelaic acid, sebacic acid, decane dicarboxylic acid, adipic acid, dodecane dicarboxylic acid, succinic acid, maleic acid or dimeric fatty acids, hydroxycarboxylic acids and/or lactones, such as 12-hydroxy stearic acid, ε-caprolactone or hydroxy pivalic acid ester of neopentyl glycol, can also be used. Monocarboxylic acids, such as benzoic acid, tert. butyl benzoic acid, hexahydro benzoic acid and saturated aliphatic monocarboxylic acids are also used in small amounts.

Aliphatic diols should be mentioned as suitable alcohol components, such as ethylene glycol, 1,3-propanediol, 1,2-propanediol, 1,2-butanediol, 1,3-butanediol, 1,4-butanediol, 2,2-dimethyl propanediol-1,3 (neopentyl glycol), 2,5-hexanediol, 1,6-hexanediol, 2,2-[bis-(4-hydroxycyclo hexyl)] propane, 1,4-dimethylol cyclohexane, diethylene glycol, dipropylene glycol and 2,2-bis-[4-(2-hydroxyl)] phenyl propane. Polyols are also used in small amounts, such as glycerol, hexanetriol, pentaerythritol, sorbitol, trimethylol ethane, trimethylol propane and tris(2-hydroxy) isocyanurate. It is also possible to use epoxy compounds in place of diols or polyols. The proportion of neopentyl glycol and/or propylene glycol in the alcohol component preferably is at least 50 mol-% in relation to the total acids.

Suitable semi-crystalline polyesters have an acid value number of 10 to 400 (mg KOH/g) and an exactly defined DSC melting point. The semi-crystalline polyesters are condensation products from aliphatic polyols, preferably aliphatic diols, and aliphatic and/or cycloaliphatic and/or aromatic polybasic carboxylic acids, preferably dibasic acids. Examples of aliphatic polyols are: ethylene glycol (1,2-ethane diol), propylene glycol (1,3-propane diol), butylene glycol (1,4-butane diol), 1,6-hexane diol, neopentyl glycol, cyclohexane dimethanol, trimethylol propane, etc. Aliphatic diols are preferred, such as ethylene glycol, butylene glycol or 1,6-hexane diol.

Suitable polybasic carboxylic acids are aliphatic dicarboxylic acids, preferably $C_4$–$C_{20}$-dicarboxylic acids, such as adipic acid, azelaic acid, sebacic acid, dodecane dicarboxylic acid, succinic acid, undecane dicarboxylic acid, and aromatic dicarboxylic acids, such as terephthalic acid, isophthalic acid, phthalic acid and their hydration products, such as 1,4-cyclohexane dicarboxylic acid. Aliphatic dicarboxylic acids with 6 to 12 carbon atoms are preferred. It is of course also possible to employ mixtures of various polyols and polybasic carboxylic acids.

Suitable carboxyl-functional acrylate resins have an acid value number of 10 to 400 (mg KOH/g). The combination and production is analogous with the carboxyl-functional acrylate copolymer (D).

Said component (B) is present in an amount between 0.4 and 1.4, preferred between 0.8 and 1.2 carboxyl groups or anhydride groups pre epoxy group, whereby mixtures of several hardeners can be used in the thermosetting powder coating systems The acrylate copolymers containing epoxy-groups (A) generally have molecular weights (Mw) between 1,000 to 30,000. Their glass transition temperature (Tg) lies in the range between 20 and 120° C. and the epoxide number in the range between 0.018 and 0.510 (equiv./100 g), preferred between 0.04 and 0.27 (equiv./100 g). Preferably the molecular weight lies between 1,000 and 20,000 and the Tg lies in the range between 30 and 90° C.

The invention also relates to a method for producing thermosetting powder coating systems based on epoxy group-containing acrylate copolymers, including a first step, wherein carboxyl-functional acrylate copolymers (D) are produced by radical copolymerisation and subsequently separated. In a second step said acrylate copolymers (D) are reacted in the presence of a catalyst with epihaloalkanes to form epoxy groups-containing acrylate copolymers (A). Said copolymers (A) as binder resins are jointly extruded with at least one carboxyfunctional component (B) as a hardener and optionally with compounds (C): commercially available pigments, fillers and additives.

The carboxyl-functional acrylate copolymer is copolymerized from the mixture of the following monomers:

a) 0 to 70 parts of weight of methyl acrylate or methyl methacrylate or their mixtures b) 0 to 60 parts of weight of at least one alkyl or an cycloalkyl ester of acrylic or methacrylic acid, having 2 to 18 C atoms in the alkyl or cycloalkyl rests, c) 0 to 90 parts of weight of at least one vinyl aromatic, d) 1 to 70 parts of weight of at least one unsaturated olefinic carboxylic acid, wherein the sum of the parts of weight a) to d) is 100.

The production of the copolymers (D) can take place by copolymerization of said monomers (a) to (d) in accordance with conventional radical polymerization methods, such as solvent, emulsion, bead or substance polymerization. In the process, the monomers are copolymerized at temperatures between 60 to 160° C., preferably 80 to 150° C., in the presence of radical formers and optionally molecular weight adjusters.

The production of the carboxyl-functional acrylate copolymers preferably takes place in inert solvents. Suitable solvents are, for example, aromatics such as benzene, toluene, xylene, esters, such as ethyl acetate, butyl acetate, hexyl acetate, heptyl acetate, methylglycol acetate, ethylglycol acetate, methoxy-propyl acetate, ethers, such as tetrahydrofuran, dioxane, diethyleneglycol dimethyl ether, ketones, such as acetone, methylethyl ketone, methylisobutyl ketone, methyl-n-amyl ketone, methylisoamyl ketone or arbitrary mixtures of such solvents.

The production of the copolymers can take place continuously or discontinuously. Usually the monomer mixture and the radical formers are metered evenly and continuously into a polymerization reactor and the corresponding amount of polymer is simultaneously removed. In this way in a preferred manner it is possible to produce copolymers which are nearly chemically uniform. Copolymers which are nearly chemically uniform can also be produced by letting the reaction mixture and the radical formers run at a constant speed into a mixing vessel without removing the polymer.

It is also possible to introduce a portion of the monomers into solvents of the type mentioned and to add the remaining monomers and auxiliary agents separately or together to this receiver at the reaction temperature.

Polymerization generally takes place at atmospheric pressure, however, it can also be performed at pressures up to 25 bar. Initiators are used in amounts of 0.1 to 10 % by weight in relation to the total amount of monomers.

Conventional radical formers are suitable initiators, for example aliphatic azo compounds such as azodiisobutyric acid nitrile, azo-bis- 2-methyl valeronitrile, 1,1'-azo-bis-cyclohexane nitrile and 2,2'-azo-bis-isobutyric acid alkylester, symmetrical diacyl- peroxides, such as acetyl, propionyl or butyryl peroxide, benzoyl peroxides substituted with bromide-, nitro-, methyl- or methoxy-groups, lauryl peroxides, symmetrical peroxydi- carbonates, such as tert. Butylperbenzoate, hydroperoxides, such as tert. butyl hydroperoxide, cumene hydroperoxide, dialkyl peroxides, such as dicumyl peroxide, tert. butylcumyl peroxide or di-tert.-butyl peroxide.

To adjust the molecular weight of the copolymers it is possible to employ conventional adjusters during production. Examples of these are mercaptopropionic acid, tert.-dodecyl-mercaptane, n-dodecylmercaptane or diisopropyl xanthogen disulfide. The adjusters can be added in amounts of 0.1 to 10 weight-% in relation to the total amount of monomers.

The solutions of the copolymers occurring during copolymerisation can then be brought to the evaporation or degassing process without further preparation, wherein the solvents are removed, for example in an evaporation extruder or spray dryer at approximately 120 to 160° C. and in a vacuum of 100 to 300 mbar, and the inventive copolymers are obtained.

The conversion of the carboxyl-functional copolymers (D) with epihaloalkanes to the epoxy group-containing acrylate copolymers (A) in accordance with the invention is performed in the following manner:

Epoxy group-containing acrylate copolymers (A) are obtained very rapidly in that the carboxyl-functional acrylate copolymer (D) is dissolved in an excess of epihaloalkane. Following this, a catalyst is added to the reaction mixture and stirring is performed at an increased temperature over a sufficient length of time until all carboxyl groups have reacted. A period of time of one hour is cited by way of example. After this the reaction mixture is washed with water to remove the catalyst. Then the excess epihaloalkane and dihaloalkane are removed, for example by means of vacuum distillation (for example 5 mm Hg) at suitable temperatures (for example 95° C.).

Catalysts for this method are benzyl-trimethyl ammonium bromide, tetramethyl ammonium bromide and benzyltrimethyl ammonium chloride, whereby benzyltrimethyl ammonium bromide is preferred.

With this method, stirring is performed at increased temperatures, for example 100° C.

The suitable temperature range lies between 70° C. and approximately 180° C., preferably between 100 and 130° C.

Suitable epihaloalkanes are 1-chloro-2,3-epoxypropane (epichlorohydrin), 1-chloro-2-methyl-2,3-epoxypropane and 1- chloro-2,3-epoxybutane. 1-chloro-2,3-epoxypropane is preferably used. It is of course also possible to use further epihaloalkanes successfully, such as epibromohydrin.

In this process the removal of excess epihaloalkanes takes place by vacuum distillation, for example at 5 mm Hg, wherein the vacuum can extend from 0.01 mm Hg to 700 mm Hg.

Another suitable process is based on the reaction of a salt, preferably an alkali salt of the carboxyl-functional acrylate copolymer (D), with an epihalohydrin, preferably epichlorohydrin.

The acrylate copolymers containing epoxide groups (A) have a glass transition temperature of 20 to 120° C. The preferred glass transition temperature lies in the range between 30 to 90° C. The molecular weights (Mw) in general are 1000 to 30,000, preferably 1000 to 20,000. The epoxide number of the acrylate copolymers containing epoxide groups in accordance with the invention lies in the range between 0.018 and 0.510, (equiv./100 g of copolymer), preferably between 0.04 and 0.27 (equiv./100 g of polymer).

The component (B) is advantageously selected from the group consisting of saturated aliphatic polycarboxylic acids with 4 to 13 C atoms, whereby dicarboxylic acids are preferred, cycloaliphatic dicarboxylic acids with 8 to 15 C atoms, monomeric or polymeric or polyol-modified anhydride of an aliphatic or cycloaliphatic dicarboxylic acid, amorphous, carboxyl-functional copolyester resins having an acid value number of 10 to 200 (mg KOH/g) and a Tg higher than 40° C., semi crystalline carboxyl-functional copolyester resins having an acid value number of 10 to 400 (mg KOH/g), carboxyl-functional acrylate resins, having an acid value number of 10 to 400 (mg KOH/G).

Aliphatic polybasic acids, preferably dibasic acids, such as adipinic acid, pimelic acid, suberic acid, azelaic acid, sebacic acid, malonic acid, succinic acid, glutaric acid, 1,12-dodecane dioic acid, etc. can be used as the hardeners—components (B)—. The anhydrides of these acids can also be employed, for example glutaric acid anhydride, succinic acid anhydride, as well as the polyanhydrides of these dicarboxylic acids. These polyanhydrides are obtained by intermolecular condensation of the said aliphatic dibasic dicarbonic acids.

Examples are adipic acid (poly) anhydride, azelaic acid (poly) anhydride, sebacic acid (poly) anhydride, dodecane dioic acid (poly) anhydride, etc. The polyanhydrides have a molecular weight (average weight in relation to the polystyrene standard) of 1000 to 5000. The polyanhydrides can also be modified with polyol.

The polyanhydrides can also be employed in a mixture with the aliphatic dibasic dicarboxylic acids as hardening agents, or in a mixture with hydroxycarboxylic acids, which have melting points between 40 and 150° C., for example 12- hydroxy stearic acid, 2- or 3- or 10-hydroxy octadecanic acid, 2-hydroxy myristic acid.

Cycloaliphatic dicarboxylic acids, such as 1,4- cyclohexane dicarboxylic acid, or their polyanhydrides can also be employed as hardeners.

Amorphous and semi-crystalline carboxyl-functional copolyesters are also suitable hardeners.

The amorphous as well as the semi-crystalline carboxyl-functional copolyesters can be produced by condensation processes (esterification and/or transesterification) known for polyesters in accordance with the prior art. If necessary, it is also possible to use suitable catalysts, such as dibutyl stannic oxide or titanium tetrabutylate. Suitable amorphous carboxyl-functional copolyester resins have an acid value number of 10 to 200 (mg KOH/g) and a glass transition temperature of >40° C. Amorphous carboxyl-functional copolyesters mainly contain aromatic polybasic carboxylic acids as acid components, such as terephthalic acid, isophthalic acid, phthalic acid, pyromellitic acid, trimellitic acid, 3,6-dichlorophthalic acid, tetrachlorophthalic acid and, to the extent available, their anhydride, chloride or ester. They mostly contain at least 50 mol-% terephthalic acid and/or isophthalic acid, preferably 80 mol-%. The remainder of the acids (difference with 100 mol-%) consists of aliphatic and/or cycloaliphatic polybasic acids, such as 1,4-cyclohexane dicarboxylic acid, tetrahydrophthalic acid, hexahydroendomethylene terephthalic acid, hexachlorophthalic acid, azelaic acid, sebacic acid, decane dicarboxylic acid, adipic acid, dodecane dicarboxylic acid, succinic acid, maleic acid or dimeric fatty acids, hydroxycarbocylic acids and/or lactones, such as 12-hydroxy stearic acid, ε-caprolactone or hydroxy pivalic acid ester of neopentyl glycol, can also be used. Monocarboxylic acids, such as benzoic acid, tert. butyl benzoic acid, hexahydro benzoic acid and saturated aliphatic monocarboxylic acids are also used in small amounts.

Aliphatic diols should be mentioned as suitable alcohol components, such as ethylene glycol, 1,3-propanediol, 1,2-propanediol, 1,2-butanediol, 1,3-butanediol, 1,4-butanediol, 2,2-dimethyl propanediol-1,3 (neopentyl glycol), 2,5-hexanediol, 1,6-hexanediol, 2,2-[bis-(4-hydroxycyclo hexyl)]propane, 1,4-dimethylolcyclo hexane, diethylene glycol, dipropylene glycol and 2,2-bis-[4-(2-hydroxyl)] phenyl propane. Polyols are also used in small amounts, such as glycerol, hexanetriol, pentaerthritol, sorbitol, trimethylol ethane, trimethylol propane and tris(2-hydroxy) isocyanurate. It is also possible to use epoxy compounds in place of diols or polyols. The proportion of neopentyl glycol and/or propylene glycol in the alcohol component preferably is at least 50 mol-% in relation to the total acids.

Suitable semi-crystalline polyesters have an acid value number of 10 to 400 (mg KOH/g) and an exactly defined DSC melting point. The semi-crystalline polyesters are condensation products from aliphatic polyols, preferably aliphatic diols, and aliphatic and/or cycloaliphatic and/or aromatic polybasic carboxylic acids, preferably dibasic acids. Examples of aliphatic polyols are: ethylene glycol (1,2-ethane diol), propylene glycol (1,3-propane diol), butylene glycol (1,4-butane diol), 1,6-hexane diol, neopentyl glycol, cyclohexane dimethanol, trimethylol propane, etc. Aliphatic diols are preferred, such as ethylene glycol, butylene glycol or 1,6-hexane diol.

Suitable polybasic carboxylic acids are aliphatic dicarboxylic acids, preferably $C_4$–$C_{20}$-dicarboxylic acids, such as adipic acid, azelaic acid, sebacic acid, dodecane dicarboxylic acid, succinic acid, undecane dicarboxylic acid, and aromatic dicarboxylic acids, such as terephthalic acid, isophthalic acid, phthalic acid and their hydration products, such as 1,4-cyclohexane dicarboxylic acid. Aliphatic dicarboxylic acids with 6 to 12 carbon atoms are preferred. It is of course also possible to employ mixtures of various polyols and polybasic carboxylic acids.

Suitable carboxyl-functional acrylate resins have an acid value number of 10 to 400 (mg KOH/g). The combination and production is analogous with the carboxyl-functional acrylate copolymer (D).

The amounts of anhydrides and carboxyl-functional compounds used as the hardeners (B) in relation to the acrylic resin, can vary over a wide range and depends on the number of epoxide groups in the acrylate resin. Generally a mol ratio of carboxyl groups or anhydride groups to epoxide groups of 0.4 to 1.4:1, preferably of 0.8 to 1.2:1, is selected. Mixtures of several hardeners can also be used in the thermosetting powder coating systems The pigments and/or fillers and/or additives (C) usual for producing powder coatings can be added to the coating materials in accordance with the invention.

These are additives from the group of accelerators, flow control and degassing agents, heat, UV and/or HALS stabilizers and/or tribo-electrical additives, as well as matting agents, such as waxes, if required.

Production of the thermosetting powder coating systems in accordance with the invention preferably takes place in the molten mass by mutual extrusion of all formulation components at temperatures between 60 to 140° C. The extrudate is subsequently cooled, ground and screened to a grain size of less than 90 mm. Other methods are basically also suitable for producing the powder coatings, for example mixing of the formulation components in solution and subsequent precipitation or removal of the solvents by distillation.

The application of the powder coatings by means of processes usual for powder coatings, for example by means of electrostatic spraying devices of the corona or triboelectrical spraying method or in accordance with the fluidized bed method is also included in this invention and of course the thermosetting powder coating systems, which can be produced by the method as described above.

The production and properties of the inventive thermosetting powder coating systemss will be represented by means of examples below.

Production of Carboxyl-Functional Acrylate Copolymers

EXAMPLES 1 AND 2

General Production Formula

Part I (see Table 1) is placed into a special steel reactor with stirring, cooling and heating devices as well as electronic temperature control and is heated in a nitrogen atmosphere until reflux occurs. Part II and part III (see Table 1) are parallel slowly added over three hours, wherein the reaction mixture is boiled under reflux. When the addition of part II and part III has been terminated, the reaction mixture is boiled for an additional two hours under reflux. Subsequently the solvent is removed from the reaction mixture in a vacuum.

TABLE 1

Acrylate Copolymers Containing Carboxyl Groups

|  | Example 1 | Example 2 |
| --- | --- | --- |
| Resin No. | I | II |
| Part I |  |  |
| Xylene | 1000.00 | 1000.00 |
| Part II |  |  |
| Di-tert.-butylperoxide | 46.25 | 46.25 |
| Xylene | 78.75 | 78.75 |
| Part III |  |  |
| Methacrylic acid | 355.43 | 284.44 |
| n-Butyl acrylate | 185.00 | 185.00 |
| Methylmethacrylate | 962.69 | 1033.69 |
| Styrene | 809.38 | 809.38 |
| Mercaptopropionic acid | 57.90 | 57.90 |

TABLE 2

Properties of Examples 1 to 2

|  | Example 1 | Example 2 |
| --- | --- | --- |
| Resin No. | I | II |
| Acid value no. [mg KOH/g] | 97.6 | 78.5 |
| Tg [° C.] (calculated) | 95 | 93 |
| Molecular weight (Mw) | 7900 | 7800 |

Manufacture of the Acrylate Copolymers Containing Epoxide Groups in Accordance with the Invention

EXAMPLES 3 TO 6

Example 3

1850 g epichlorohydrin and 560 g resin No. 1 are placed into a heatable three-liter reactor provided with a thermometer, stirrer and reflux column. Subsequently the temperature is increased to 100° C. After the temperature has reached 100° C., 18.6 g benzyltrimethyl ammonium chloride are added to the homogeneous solution. The solution is then stirred for one hour at 100° C. and thereafter cooled to room temperature. The organic phase is washed with water (3×1, 400 ml) and the resin No. III (see Table 3 for properties) is obtained following vacuum distillation at a temperature of 95° C. under reduced pressure (1 mm Hg).

Example 4

925 g epichlorohydrin and 560 g resin No. I are placed into a heatable six-liter reactor provided with a thermometer, stirrer and reflux column. Subsequently the temperature is increased to 100° C. After the temperature has reached 100° C., 18.6 g benzyltrimethyl ammonium chloride are added to the homogeneous solution. The solution is then stirred for one hour at 100° C. and thereafter cooled to 50° C. After the addition of 2000 g toluene, 190 g sodium hydroxide solution (22% strength) are added and stirring is continued for another hour at 50° C. The aqueous phase is subsequently separated. The resin No. IV (see Table 3 for properties) is obtained after vacuum distillation of the organic phase at a temperature of 130° C. under reduced pressure (1 mm Hg).

Example 5

1850 g epichlorohydrin and 700 g resin No. II are placed into a heatable three-liter reactor provided with a thermometer, stirrer and reflux column. Subsequently the temperature is increased to 100° C. After the temperature has reached 100° C., 18.6 g benzyltrimethyl ammonium chloride are added to the homogeneous solution. The solution is then stirred for one hour at 100° C. and thereafter cooled to room temperature. The organic phase is washed with water (3×1, 400 ml) and the resin No. V (see Table 3 for properties) is obtained following vacuum distillation at a temperature of 95° C. under reduced pressure (1 mm Hg).

Example 6

925 g epichlorohydrin and 700 9 resin No. II are placed into a heatable six-liter reactor provided with a thermometer, stirrer and reflux column. Subsequently the temperature is increased to 100° C. After the temperature has reached 100° C., 18.6 g benzyltrimethyl ammonium chloride are added to the homogeneous solution. The solution is then stirred for one hour at 100° C. and thereafter cooled to 50° C. After the addition of 2000 g toluene, 190 g sodium hydroxide solution (22% strength) are added and stirring is continued for another hour at 50° C. The aqueous phase is subsequently separated. The resin No. VI (see Table 3 for properties) is obtained after vacuum distillation of the organic phase at a temperature of 130° C. under reduced pressure (1 mm Hg).

TABLE 3

Properties of Examples 4 to 6

|  | Example 3 | Example 4 | Example 5 | Example 6 |
| --- | --- | --- | --- | --- |
| Resin No. | III | IV | V | VI |
| Starter resin | I | I | II | II |
| E-No. (equiv./100 g) | 0.145 | 0.146 | 0.118 | 0.116 |
| Tg [° C.] (calculated) | 70 | 71 | 72 | 73 |
| Molecular weight (Mw) | 7900 | 7900 | 7800 | 7800 |

E-No = Epoxide Number

Production of the Powder Coatings

EXAMPLES 7 AND 8

845 parts by weight of the resin No. III or resin No. IV, 150 parts by weight of dodecane dicarboxylic acid and 5 parts by weight of benzoin are mixed while dry in a Henschel mixer at 700 rpm for 30 sec and subsequently are extruded from a Buss co-kneader (PLK 46) at a shell temperature of 100° C., cooled screw and screw rotation of 150 rpm. The extrudate is cooled, comminuted and screened to less than 90 mm.

The powder coatings are electrostatically applied (by means of the corona or triboelectrical powder spray process) to aluminum sheets (Q-panel AL 36 5005 H 14/08 (0.8 mm))

and are thermoset at a baking temperature of 200° C. and a baking time of 15 min.

Table 4 shows the technical coating properties of Examples 7 to 10.

EXAMPLES 9 AND 10

875 parts by weight of the resin No. V or resin No. VI, 120 parts by weight of dodecane dicarboxylic acid and 5 parts by weight of benzoin are mixed while dry in a Henschel mixer at 700 rpm for 30 sec and subsequently are extruded from a Buss co-kneader (PLK 46) at a shell temperature of 100° C., cooled screw and screw rotation of 150 rpm. The extrudate is cooled, comminuted and screened to less than 90 mm.

The powder coatings are electrostatically applied (by the corona or tribo-electrical powder spray process) to aluminum sheets (Q-panel AL 36 5005 H 14/08 (0.8mm)) and are thermoset at a baking temperature of 200° C. and a baking time of 15 min.

Table 4 shows the technical coating properties of Examples 7 to 10.

TABLE 4

|  | Example 7 | Example 8 | Example 9 | Example 10 |
| --- | --- | --- | --- | --- |
| Resin base | III | IV | V | VI |
| Gel time/Kofler Bank 200° C. | 31 | 30 | 28 | 29 |
| Gloss (60° C.) (DIN 67530) | 109 | 108 | 108 | 109 |
| Flow | excellent | excellent | excellent | excellent |
| Erichsen penetration | 9.9 | 9.8 | 9.8 | 9.9 |
| Gross cut (DIN 52151) | 0 | 0 | 0 | 0 |
| Impact (ASTM D 2794, on back) | 30 | 40 | 30 | 20 |

What is claimed is:

1. A method for producing a powder coating based on acrylate copolymers containing epoxy groups comprising:
   (a) producing carboxy-functional acrylate copolymers by radical copolymerization in an inert solvent;
   (b) separating said carboxy-functional acrylate copolymers and reacting said carboxy-functional acrylate copolymers with at least one epihaloalkane in the presence of a catalyst, wherein said at least one epihaloalkane is used in a molar excess of 10:1 based on the moles of carboxylic groups of said copolymers;
   (c) removing excess epihaloalkane;
   (d) adding toluene and subsequently reacting said acrylate copolymers with a sodium hydroxide solution to produce acrylate copolymers containing epoxy groups, wherein said acrylate copolymers containing epoxy groups have an epoxide number of from 0.018 to 0.501 (equiv./100 g copolymer), a weight average molecular weight of from 1000 to 30,000 and a glass transition temperature of from 20 to 120° C.; and
   (e) extruding said acrylate copolymers containing epoxy groups together with a hardener selected from the group consisting of aliphatic polybasic acids, anhydrides of cycloaliphatic polybasic acids, polyol-modified anhydrides of cycloaliphatic polybasic acids, amorphous carboxy-functional copolyester resins, semi-crystalline carboxy-functional copolyester resins, carboxy-functional acrylate resins, and mixtures thereof, along with optional pigments, fillers, or additives other than pigments or fillers or mixtures thereof; to form a thermosetting powder coating.

2. A method according to claim 1 wherein said carboxy-functional acrylate copolymer is copolymerized from a mixture of:
   (a) 0 to 70 parts by weight of an acrylate monomer selected from the group consisting of methylacrylate, methylmethacrylate, and mixtures thereof;
   (b) 0 to 60 parts by weight of an ester selected from the group consisting of $C_2$–$C_{18}$ alkyl esters of acrylic acid, $C_2$–$C_{18}$ alkyl esters of methacrylic acid, $C_2$–$C_{18}$ cycloalkyl esters of acrylic acid, $C_2$–$C_{18}$ cycloalkyl esters of methacrylic acid;
   (c) 0 to 90 parts by weight vinyl aromatics; and
   (d) 1 to 70 parts by weight of unsaturated olefinic carboxylic acids in an inert solvent;
   whereby the sum of the parts by weight of components (a) through (d) is 100.

3. A method according to claim 1 wherein said radical copolymerization is conducted at temperatures between 60 and 160° C. under a pressure of up to 25 bars, in the presence of radical formers and, optionally, in the presence of 0.1 to 10% by weight of the total-amount of monomers of molecular weight adjusters.

4. A method according to claim 3 wherein said radical copolymerization is selected from the group consisting of solvent polymerization and substance polymerization.

5. A method according to claim 4 wherein said solvent copolymerization is conducted in a first inert solvent selected from the group consisting of benzene, toluene, xylene, ethyl acetate, butyl acetate, hexyl acetate, heptyl acetate, methylglycol acetate, ethylglycol acetate, methoxypropyl acetate, tetrahydrofuran, dioxane, diethylene glycol dimethylether, acetone, methylethyl ketone, methylisobutyl ketone, methyl-n-amyl ketone, methylisoamyl ketone, and mixtures thereof.

6. A method according to claim 4 wherein said radical copolymerization is conducted continuously by metering in a mixture of said monomers and of radical formers and continuously removing copolymers formed.

7. A method according, to claim 1 wherein said radical copolymerization is conducted discontinuously under constant addition of monomer mixture and radical formers into a mixing vessel.

8. A method according to claim 1 wherein said epihaloalkane is selected from the group consisting of 1-chloro-2,3-epoxypropane; 1-chloro-2-methyl-2,3-epoxypropane; 1-chloro-2,3-epoxybutane; 1-bromo-2,3-epoxypropane, and mixtures thereof.

9. A method according to claim 4 wherein said catalyst is selected from the group consisting of benzyltrimethyl ammonium bromide, benzyltrimethyl ammonium chloride, tetramethyl ammonium bromide, ethyltriphenyl phosphonium bromide, and mixtures thereof.

10. A method according to claim 2 wherein the ester is selected from the group consisting of ethyl acrylate; ethyl methacrylate; n-propyl acrylate; n-propyl methacrylate; isopropyl acrylate; isopropyl methacrylate; n-butyl acrylate; n-butyl methacrylate; isobutyl acrylate; isobutyl methacrylate; tertbutyl acrylate; tertbutyl methacrylate; 2-ethylhexyl acrylate; 2-ethylhexyl methacrylate; cyclohexyl acrylate; cyclohexyl methacrylate; isobornyl acrylate; isobornyl methacrylate; neopentyl acrylate; neopentyl methacrylate; 3,3,5-trimethylcyclohexyl acrylate; 3,3,5-trimethylcyclohexyl methacrylate; stearyl acrylate; stearyl methacrylate; and mixtures thereof.

11. A method according to claim 2 wherein said vinyl aromatics are selected from the group consisting of styrene, vinyl toluene, a-ethylstyrene, and mixtures thereof.

12. A method according to claim 2 wherein said unsaturated olefinic carboxylic acids are selected from the group consisting of acrylic acid, methacrylic acid, crotonic acid, itaconic acid, fumaric acid, maleic acid, citraconic acid, and mixtures thereof.

13. A method according to claim 1 wherein said carboxy-functional acrylate copolymer has an acid value number between 10 and 400 (mg KOH/g copolymer).

14. A method according to claim 13 wherein said carboxy-functional acrylate copolymer has an acid value number between 10 and 200 (mg KOH/g copolymer).

15. A method according to claim 1 wherein the hardener is at least one saturated polybasic aliphatic carboxylic acid having 4 to 12 carbon atoms or a cycloaliphatic dicarboxylic acid with 8 to 15 carbon atoms.

16. A method according to claim 1 wherein said hardener is present in an amount which corresponds to 0.4 to 1.4 carboxyl groups or anhydride groups per epoxide group of the acrylate copolymer.

17. A method according to claim 16 wherein said hardener is present in an amount which corresponds to 0.8 to 1.2 carboxyl groups or anhydride groups per epoxide group of the acrylate copolymer.

18. A method according to claim 1 wherein said acrylate copolymer has epoxide numbers in the range of 0.04 to 0.27.

19. A method according to claim 1 wherein said extrusion is conducted at a temperature range of from 60 to 140° C.

20. A coated substrate comprising a substrate which has been coated with a powder coating made according to claim 1 by a method selected from the group consisting of corona spraying, triboelectric spraying, and fluidized bed coating.

21. The method according to claim 1, wherein the excess epihaloalkane is removed by vacuum distillation.

22. The method according to claim 21, wherein the vacuum distillation is conducted at pressures ranging from 0.01 mm Hg to 700 mm Hg.

23. The method according to claim 1, wherein said carboxy-functional acrylate copolymers are reacted with said at least one epihaloalkane at a temperature ranging between 70° C. and approximately 180° C.

24. The method according to claim 1, wherein said carboxy-functional acrylate copolymers are reacted with said at least one epihaloalkane at a temperature ranging between 100° C. and 130° C.

* * * * *